United States Patent [19]

Babayan

[11] 3,847,723

[45] Nov. 12, 1974

[54] FLAME RETARDANT BUTYL RUBBER

[75] Inventor: Eduard P. Babayan, Huntington Beach, Calif.

[73] Assignee: Hitco, Irvine, Calif.

[22] Filed: Apr. 25, 1973

[21] Appl. No.: 354,257

[52] U.S. Cl. ............... 161/160, 52/516, 117/104 A, 161/190, 161/403, 260/2.5 AJ, 260/28.5 B, 260/11.5 R, 260/45.7 R, 260/45.75 B
[51] Int. Cl. .......................... C08d 11/04, C08j 1/36
[58] Field of Search ................... 161/190, 403, 160; 260/28.5 B, 45.75 B, 45.7 R, 2.5 AJ, 41.5 R, DIG. 24; 117/104 A

[56] References Cited
UNITED STATES PATENTS

| | | | |
|---|---|---|---|
| 3,654,190 | 4/1972 | Levine | 260/28.5 |
| 3,714,047 | 1/1973 | Marion et al. | 161/190 |
| 3,133,038 | 5/1964 | Hahn | 260/45.75 |
| 3,686,362 | 8/1972 | Hinckley et al. | 260/45.95 |
| 3,466,222 | 9/1969 | Curtis | 161/403 |
| 3,673,128 | 6/1972 | Hayash et al. | 161/190 |
| 3,164,558 | 1/1965 | Eichhorn | 260/2.5 |

OTHER PUBLICATIONS

Vanderkelt Rubber Handbook, 1958, pp. 93 and 94.

*Primary Examiner*—V. P. Hoke
*Attorney, Agent, or Firm*—Marvin E. Jacobs

[57] ABSTRACT

An ambient curing butyl rubber is prepared from a composition comprising a liquid copolymer of isobutylene and isoprene, an ambient curing agent therefor such as p-quinone dioxime and lead oxide and a synergistic combination of hexabromobenzene, antimony oxide and a chlorinated paraffin as a flame retardant which renders the composition self-extinguishing without affecting the physical properties of the rubber. The composition is useful as a sprayable protective coating over urethane foam roofs.

12 Claims, No Drawings

FLAME RETARDANT BUTYL RUBBER

BACKGROUND OF THE INVENTION

1. Field of the Invention

The present invention relates to an improved butyl-type of rubber composition and, more particularly, this invention relates to an ambient curing, sprayable, self-extinguishing butyl rubber composition.

2. History of the Prior Art

Recently low molecular weight alkylene-diene copolymers have become available which have molecular weights approximately 1/10 that of standard grades of butyl rubber. The lower molecular weight prepolymers are viscous liquids rather than amorphous solids as are the conventional dry rubbers and can be cured to form high molecular weight analogs of butyl rubber having similar properties such as low vapor permeability, resistance to ozone, high electrical, chemical, ozone and humidity resistance, effective vibration and sound dampening and good maintenance of dimensional stability and elasticity.

The outstanding weatherability, flexibility and water resistance of butyl rubber makes it useful as a roofing material where it can be formulated to serve as a primary seal or as a top coat for existing roofs. Its low water vapor and gas transmission rates make it especially useful for foam roofs or in insulated freezer buildings where food is stored in inert gas atmosphere. Asphalt coatings are approximately 25 times more permeable to moisture than butyl coatings. However, the strength of the cured prepolymers is lower than that of conventional butyl rubber coatings and the flammability characteristics are not acceptable. When the prepolymer composition is compounded with typical flame retardant agents such as antimony trioxide and organic chloride, the retardants must be present in such a high level that the physical properties of the final elastomer are seriously degraded. A flame retardant, low permeability roofing coating is especially needed when utilized to cover urethane foam roofs since if water can permeate into the foam layer, at sub-freezing temperatures the water will freeze, expand and rupture the foam which will deteriorate and eventually lead to rupture of the surface coating.

SUMMARY OF THE INVENTION

An improved butyl-type prepolymer composition has been formulated in accordance with the invention including a synergistic combination of flame retardant agents which render the composition self-extinguishing without affecting the physical properties of the final rubber material. The composition in accordance with the invention on a basis of 100 parts of liquid butyl prepolymer includes 10-40 parts of hexabromobenzene, 5-25 parts of antimony trioxide and optionally 0-20 parts of a low molecular weight chlorinated paraffin and preferably 5-15 parts thereof. The composition also contains a low-temperature or heat curing curative system and various other additives or adjuvants such as accelerators, pigments, defoamers, dispersants, cure promoters or auxiliary materials for increasing or reducing the surface tack which can be added to the composition without affecting the flammability characteristics of the coating. The solids content is preferably adjusted to the range of no more than 70 percent and no less than 40 percent solids such that the composition can be sprayed onto a surface.

The butyl prepolymer materials are low molecular weight liquids having a viscosity average molecular weight between 15,000 and 50,000, typically about 25,000 to 35,000. The prepolymers are copolymers of a minor amount, typically 1 to 3 percent by weight of a 1,4-diene such as butadiene, isoprene or 2-methyl, 3-chlorobutadiene and a branched chain alkylene containing four to eight carbon atoms such as isobutylene or isoamylene. The properties of two typical liquid prepolymeric butyl rubbers are presented in the following table.

TABLE 1

|  | Enjay Butyl LM | Enjay Chlorobutyl LM |
|---|---|---|
| MOLECULAR WEIGHT |  |  |
| Viscosity Average | 32,500 | 30,000 |
| FUNCTIONALITY |  |  |
| Unsaturation, mole — % | 4.2 |  |
| Chlorine, weight — % |  | 3 |
| BULK VISCOSITY, poises |  |  |
| 150 F | 10,000 | 10,000 |
| 200 F | 2,000 | 2,000 |
| 250 F | 800 | 800 |
| SPECIFIC GRAVITY | 9.02 | 9.02 |

The prepolymers can be utilized alone, in combination with each other or in combination with other compatible curing materials such as conventional high molecular weight butyl rubber. However, chlorobutyl LM and high molecular weight butyl require high temperature cures and are not as readily formulated into compositions having viscosities or consistencies suitable for spray application. The compositions can be compounded by directly blending the prepolymer with other compounding ingredients such as fillers, plasticizers, etc., in a moderate shear mixer such as a kneader or the prepolymer can be solvated and other ingredients added using equipment typical for compounding sealants or paints such as a Sigma mixer or a mill.

The compositions can be cured with the high temperature sulphur based systems utilized previously to cure butyl rubber such as sulphur with TDEC AND MBTS, tin chloride with MPFR or lead oxide-MBTS-quinoid type of curing systems. These systems have the advantage of being very fast but have the disadvantage of requiring high temperatures in the range of 300°-450°F which may not be compatible with the substrate being coated and requires the availability of high temperature sources to promote the cure.

The quinoid cure system is of particular value for the composition of the invention since it permits room temperature curing of the prepolymer and characteristically results in a more ozone and heat resistant vulcanizate. This system involves the use of a quinone dioxime such as p-quinone dioxime or dibenzoyl p-quinone dioxime and an oxidizer, neither of which induces cross-linking by itself. When these two reagents are combined, the para-quinone dioxime is oxidized to dinitrosobenzene by the oxidizing agent and becomes an effective cross-linking agent. The cross-linking takes place at the allylic carbon atoms in the isoprene units of the polymer chain. Unless the composition is to be utilized immediately, two-part systems are produced which are stable until mixed such as in the head of a spray gun.

Although lead dioxide is the most common oxidizing agent used with p-quinone dioxime, similar results can be obtained using manganese dioxide or a combination of an organic peroxide such as t-butyl perbenzoate with a metal soap such as cobalt naphthenate. Though cures based on organic peroxide oxidizer provide light colored stocks, the weathering resistance in roof coatings is not as desirable. Cures can also proceed via halomethylphenolic resins such as CRJ-328 (Schenectady) or cures aided by dichloro-dimethyl-hydantoin can be utilized.

$PbO_2$ is a difficult material to disperse and it is usually prepared as a paste in inert carriers such as dibutyl phthalate containing stearic acid as a lubricant and activator before addition to the master batch. p-quinone dioxime is typically present in an amount of 2–4 parts per 100 parts of resin and the oxidizer in an amount of 3–10 parts per 100 parts of resin. The lead oxide paste usually contains 0.25 to 2 parts per 100 parts of resin of dibutyl phthalate and 0.25 to 2 phr of stearic acid.

The dioxime and the oxidizer such as lead dioxide are finely divided powders which must react in order to produce a cured compound. Even though the quinone dioxime is very slightly soluble in toluene, it is effective if stirred into the toluene containing formulation. An increase in toluene content causes more p-quinone dioxime to go into solution and results in an increased cure rate. Replacement of toluene by solvent in which the dioxime is less soluble, e.g., mineral spirits, results in a decreased cure rate while substitution of the toluene for a solvent that more readily dissolves the dioxime, e.g., 2-pyrrolidone, acts as a cure accelerator. Since $PbO_2$ is insoluble in the formulation, an increase in the surface area of the $PbO_2$ will increase the cure rate of the compound. Gel time is significantly shortened when the $PbO_2$ has a particle size of no more than $0.30\mu$.

Fillers which deactivate the oxidizers are oxidizing fillers such as channel blacks which react with the dioxime and reduce shelf life and should be avoided. The quinoid cure system can be modified by the use of cure activators such as water, acetic acid, 2-pyrrolidone, neodecanoic acid, and cobalt naphthenate. The system can be adjusted to cure in hours or weeks.

Subject to the qualifications discussed above with the curative, fillers of diverse types can be incorporated into the composition in an amount from 50 to 250 parts per 100 parts of resin. As in other rubber compositions, the highest physical properties are obtained with black filled systems, especially the high reinforcing, high surface blacks. However, effective compositions are also produced including mineral fillers such as titanium dioxide, silica, silicates, asbestos and metal carbonates which are compatible with the basic formulation.

Optimum properties and chemical resistance for the solvent based coating system of the invention can be obtained without the use of plasticizers. However, plasticizers such as conventional rubber oils, ditridecyl phthalate or polybutenes can be present in amounts up to 75 parts per 100 parts of resin. A minor amount of compounding ingredients such as pigments, dyes, defoamers, dispersants, weak acids or chlorine donors such as Vulklor or acid acceptors such as manganese oxide or zinc oxide or auxiliary materials such as mineral fillers for reducing the surface tack can be present without affecting the physical properties or the flammability of the coating.

The range of ingredients and a specific example of practice for a preferred sprayable composition in accordance with the invention is provided in the following table.

TABLE 2

| Master Batch | Range, phr | Specific, phr |
|---|---|---|
| Butyl LM | 100 | 100 |
| MT Black (Thermal Black) | 75–200 | 100 |
| Hexabromobenzene | 10–40 | 30 |
| Chlorowax 70 | 0–20 | 10 |
| $Sb_2O_3$ | 5–25 | 15 |
| p-Quinone Dioxime | 2–4 | 3.5 |
| Toluene (sufficient for 40% solids) | | |
| Curative | | |
| $Pb_2O_3$ | 3–10 | 6.75 |
| Dibutyl Phthalate | 0.25–2 | 0.75 |
| Stearic Acid | 0.25–2 | 0.75 |

Chlorowax 70 is a chlorinated paraffin and is one of a family of liquid and resinous chlorinated paraffins containing from 40 to 70 percent chlorine by weight. The resinous grades having a molecular weight from 800 to 1,200 are preferred and provide both a plasticizing and flame retardant effect for the composition of the invention.

The following flame retardant materials were substituted in the composition of Table 2 either alone or in combination with each other and were tested and were found to provide insufficient flame resistance to the cured material and/or interfered with the cure and therefore gave very poor physical properties.

TABLE 3

Fyrol CEF (tris (betachloroethyl) phosphate
Fyrol 32B (tris-2,3 dibromopropyl) phosphate
Fyrol FR-2 (tris (dichloropropyl) phosphate
Fire Master T33P tris (1,3 dichloroisopropyl) phosphate
Cyagard RF-1 (ethylene bis tris (2-cyanoethyl phosphonium bromide)
Cyagard RF-272 (tetra bis 2-cyanoethyl) phosphonium bromide
Cyagard RF-450
Cyagard RF-473
Phoscheck P-30
Borax
Dechlorane plus chlorinated bis phenyls The combination of dichlorane with antimony oxide which is recommended by the manufacturer as providing the best flame retardancy was formulated with the butyl LM-quin system described above and was found to be only partially self-extinguishing.

Hexabromobenzene was combined with each of the following flame retardant materials and substituted into the composition of Table 2: melamine phosphate; $BF_3$ adduct of $NH_3$; DICY; Dechlorane plus: Kloro 4515 (a brominated paraffin); Hydrated Alumina; Potassium floroborate; Cyagard RF-1 (ethylene bis tris (2-cyanoethyl) phosphate bromide); Cyagard RF-450; Fyrol CEF and Fyrol 6. In each case a cured coating was only partially self-extinguishing and the physical properties were usually degraded. Further examples illustrative of the invention follow.

Example 1

| Butyl | 100 |
|---|---|
| MT Black | 120 |
| Chlorowax 70 | 20 |
| Antimony oxide | 15 |
| p-quinone dioxime | 3 |
| Toluene | 190 |
| | 448 |
| Cure Paste | |
| PbO$_2$ | 7.5 |
| Dibutyl phthalate | 6.75 |
| Stearic Acid | 0.75 |

The material was cured out at room temperature for one week and then tested for its flammability. The coating was not self-extinguishing.

Example 2

| Butyl LM | 100 |
|---|---|
| MT Black | 120 |
| Dechlorane 602 | 20 |
| Antimony trioxide | 15 |
| p-quinone dioxime | 3 |
| Toluene | 190 |

After addition of the proper amount of the cure paste, the coating was tested after one week for flammability and its physical properties. This coating has an oxygen index, tested in accordance to ASTM Test Method D 2863-70, of .2. The tensile of the coating, however, is 220 psi with 110 percent elongation. The oxygen index test is a measure of the flammability of a material. A low oxygen index would indicate a highly flammable material, whereas a high oxygen index indicates a non-flammable material. A material with an oxygen index of 0.2–0.25 can be classified as self-extinguishing.

Example 3

| Butyl LM | 100 |
|---|---|
| MT Black | 120 |
| p-quinone dioxime | 3 |
| Hexabromobenzene | 30 |
| Antimony oxide | 15 |
| Toluene | 190 |

After addition of the proper amount of cure paste, the coating was cured for one week at room temperature and tested for its flammability and physical properties. The oxygen index on this coating is 0.20 with a tensile of 280 and 80 percent elongation.

Example 4

| Butyl LM | 100 |
|---|---|
| MT Black | 100 |
| p-quinone dioxime | 3 |
| Tetrabromophenol | 30 |
| Antimony oxide | 15 |
| Toluene | 190 |

After addition of the proper amount of cure paste and curing the coating for one week at room temperature, the flammability and the physical properties were tested. The oxygen index of this coating is 0.20 with a tensile of 180 psi and 80 percent elongation.

Example 5

| Butyl LM | 100 |
|---|---|
| MT Black | 100 |
| Chlorowax 70 | 10 |
| Hexabromobenzene | 30 |
| Antimony trioxide | 15 |
| p-quinone dioxime | 3 |
| Toluene | 190 |

After adding the proper amount of cure paste, the material was cured for one week at room temperature and then tested for its flammability and physical properties. The oxygen index of this coating is 0.22 and it has a tensile of 330 psi with 100 percent elongation.

Example 6

| Butyl LM | 100 |
|---|---|
| Titanium dioxide RA-50 | 100 |
| Chlorowax 70 | 10 |
| Hexabromobenzene | 30 |
| Antimony trioxide | 15 |
| p-quinone dioxime | 3 |
| Toluene | 190 |

After adding the proper amount of cure paste, the material was cured for one week at room temperature and then tested for its flammability and physical properties. The oxygen index of this coating is 0.21 with a tensile of 300 psi and 80 percent elongation.

Example 7

| Butyl LM-430 | 100 |
|---|---|
| Titanium dioxide RA-50 | 100 |
| p-quinone dioxime | 3 |
| Dechlorane 602 | 30 |
| Antimony oxide | 15 |
| Toluene | 190 |

After addition of the proper amount of cure paste, the material was cured at room temperature for one week and then tested for its flammability and physical properties. The oxygen index of this coating is 0.20 with a tensile strength of 150 psi and 120 percent elongation.

The oxygen index was tested according to ASTM Method No. D 2863-70. As can be seen from Examples 3, 5 and 6, hexabromobenzene in combination with antimony trioxide provides excellent fire retardant properties while not affecting the cure rate or the physical properties of the final film. Antimony trioxide provides a synergistic effect and the Chlorowax 70 contributes both to the physical properties and to the flame resistance. The compositions containing antimony oxide with Chlorowax 70 (Ex. 1) and Dechlorane 602 (Exs. 2 and 7) did not have satisfactory physical properties nor flame resistance. The composition containing tetrabromophenol with antimony oxide (Ex. 4) was also not self-extinguishing.

The preferred composition is that of Example 5. However, variations of the amount of each of the three fire retardant ingredients can be made within the ranges stated and still provide satisfactory coatings.

As can be seen from Example 6, the nature of the filler is not influential on the properties of the composition and can be a carbon black, mineral filler such as titanium dioxide or a silicate filler such as asbestos. The nature of the curative can be a lead paste, manganese oxide or a combination of organic peroxide and a metal soap.

EXAMPLE 8

The composition of Example 5 was applied by a spray gun as a 15 mil thick coating to a 1 inch thick self-extinguishing polyurethane foam on a plywood substrate. The roof coating assembly was found to satisfy the test methods for fire resistance of roof coating materials according to test method UL 790.

It is to be understood that only preferred embodiments of the invention have been described and that numerous substitutions, alterations and modifications may be made without departing from the spirit and scope of the invention as defined in the following claims.

What is claimed is:

1. A flame retardant, curable, elastomeric composition comprising in combination:
    a liquid alkylene-diene copolymer;
    an effective amount of a curing agent for the copolymer; and
    a combination of flame retardant agents comprising a combination of 10–40 parts of hexabromobenzene, 0–20 parts of a chlorinated paraffin containing 40–70 percent chlorine and 5–25 parts of antimony trioxide on the basis of 100 parts of said copolymer.

2. A composition according to claim 1 in which chlorinated paraffin is present in an amount of 5–15 parts and has a molecular weight from 800 to 1,200.

3. A composition according to claim 1 in which the solids content is between 40 percent to 70 percent.

4. A composition according to claim 3 in which the copolymer has a viscosity average molecular weight between 15,000 and 50,000 and comprises butadiene, isoprene or 2-methyl, 3-chlorobutadiene and 1 to 3 percent of a branched chain alkylene containing four to eight carbon atoms.

5. A composition according to claim 4 in which the copolymer is a copolymer of isoprene and isobutylene and the curing agent is an ambient temperature curing agent.

6. A composition according to claim 5 in which the curing agent is a combination of a quinone dioxime and an oxidizer.

7. A composition according to claim 6 in which the curing agent comprises 2–4 parts of p-quinone dioxime and 3–10 parts of lead dioxide based on 100 parts of copolymer.

8. A composition according to claim 7 further including 50–250 parts of an inert, finely divided filler.

9. A composition according to claim 8 in which the chlorinated paraffin contains 40–70 percent chlorine by weight, has a molecular weight from 800 to 1,200 and is present in an amount of 5–15 parts per 100 parts of copolymer.

10. A composition according to claim 8 in which the filler is a carbon black present in an amount of 75–200 parts per 100 parts of copolymer.

11. A self-extinguishing roof assembly comprising:
    a substrate;
    a layer of self-extinguishing polyurethane foam on said substrate; and
    a 5–25 mil thick cured coating of the composition of claim 1 on said layer.

12. A method of forming a self-extinguishing roofing comprising the steps of:
    spraying a 5–25 mil thick coating of the composition of claim 1 onto a layer of self-extinguishing polyurethane foam; and
    curing said coating.

* * * * *